J. MILTON.
Auxiliary-Governor for Steam-Engines.
No. 213,440. Patented Mar. 18, 1879.
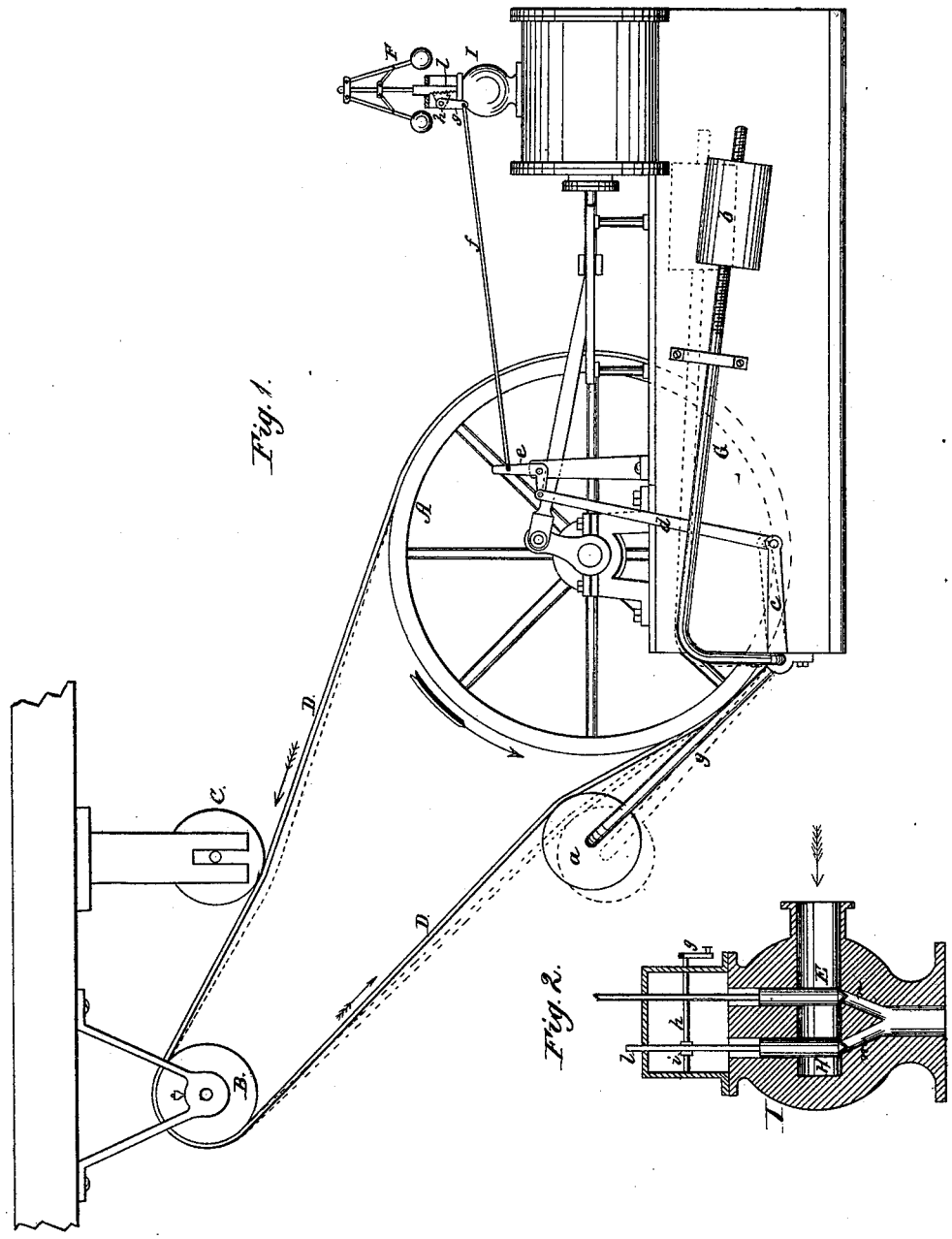
WITNESSES:
W. W. Hollingsworth
Amos W. Hart
INVENTOR:
John Milton
BY
ATTORNEYS.

UNITED STATES PATENT OFFICE.

JOHN MILTON, OF HAMILTON, VIRGINIA.

IMPROVEMENT IN AUXILIARY GOVERNORS FOR STEAM-ENGINES.

Specification forming part of Letters Patent No. 213,440, dated March 18, 1879; application filed January 13, 1879.

*To all whom it may concern:*

Be it known that I, JOHN MILTON, of Hamilton, in the county of Loudoun and State of Virginia, have invented a new and Improved Auxiliary Governor for Steam-Engines; and I do hereby declare that the following is a full, clear, and exact description of the same.

The ordinary steam-engine governor fails to act quickly when an increased load is thrown on the engine, and hence the power of the latter is checked, and a considerable time must elapse before it can attain its former speed. In other words, if an increased load is thrown on the engine its speed of motion at once diminishes, because the governor-balls (owing mainly to the influence of centrifugal action, and, in part, to friction of the working parts) cannot fall and open the valve instantly, so as to at once increase the area of the steam-passage, and thereby allow the steam to act on the piston with full force.

The object of my invention is to provide means for instantly increasing the area of the steam-passage, and thereby correspondingly increasing the power of the engine when an increased load is thrown on the latter, so that its velocity may be maintained. To this end I employ, in connection with the ordinary governor, (which is permitted to perform its function unrestricted or in the usual way,) an auxiliary governor, which is operated by the tension on or tightening of the main belt at the instant the engine is called on to perform the additional labor.

The invention consists in arranging a lever, or other movable device, in such relation to the main or driving belt of the engine that, when the slack of the belt is taken up by reason of increased tension thereon, (due to an increased load being thrown on the engine,) said lever or device will be depressed or changed in position, which will (through suitable connecting mechanism) raise a valve located in the steam-passage, and thereby open the latter and allow freer admission of steam to the engine, so as to instantly increase the power of the latter and prevent diminution of speed.

In the accompanying drawings, forming part of this specification, Figure 1 is a side view of a stationary engine having my improvement applied thereto. Fig. 2 is an enlarged cross-section of the governor-stand.

In said drawings, A indicates the band or fly-wheel of an engine; B, a pulley on the driver or power shaft, and C a tightening-pulley for taking up any undue slack in the belt D. E is the ordinary governor-valve, and F the ball-regulator connected therewith. These are arranged and operated in the usual way; but any other form of governor may be employed in place of them without affecting the operation of my invention.

The lever G and the valve H constitute the main devices of my auxiliary governor. Said lever is fulcrumed on a suitable stationary support, in such relation to the belt D that the friction-roller $a$, journaled in its shorter arm, will run in contact with and exert an upward pressure against the belt, as shown. Such pressure is regulated by the weight $b$, suspended from the lower arm of the lever.

From the fulcrum or pivot of the lever extends a radial arm, $c$, which is connected by rod $d$ with an elbow-lever, $e$. A rod, $f$, connects the latter with the arm $g$, attached to a short rock-shaft, $h$, which has its bearings in the governor-stand I. On the inner end of this shaft is a pinion or segment, $i$, which meshes with a rack formed on the stem $l$ of the auxiliary governor-valve H.

From this arrangement and connection of parts it is apparent the vibrations of the lever G will be communicated to the valve H, and cause it to rise or fall correspondingly.

The valve may be constructed like the ordinary governor-valve E, or in any other preferred manner, so long as capable of operation by lever G through any suitable connecting mechanism. It is located in the governor-stand I, alongside of or adjacent to valve E, and normally remains seated. The two valves are, however, located in separate branches, $m$ $n$, of the main steam-passage, as shown, which leads to the steam-chest.

The operation of the auxiliary governor is as follows: When the engine is running without much change in the load or draft, the ordinary governor controls its action by regulating the admission of steam; but if the load be considerably and suddenly increased, the engine will be at once slackened, because the ordinary governor will not act quickly enough to instantly open the valve E, and thus allow admission of the full head of steam to the piston-cylinder, for the purpose of counteracting or opposing the tendency to retardation of velocity. This function is performed by my auxiliary governor in the following manner: When the increased load is thrown on the engine the rotation of the power-shaft is diminished proportionately, so that the lower half of the belt D will be thereby suddenly subjected to increased tension and drawn taut, while the upper half will be simultaneously slackened, as shown in dotted lines. The short arm of the lever G is thus depressed and its weighted end raised, and the arm c, attached to its fulcrum, thrown over to the left, so that the pinion or rock-shaft h is rotated a part of a revolution, and the valve H thereby raised from its seat. This movement of the valve opens the branch m, and allows free admission of steam to the steam-chest. The increased pressure of steam in the cylinder instantly adds to the power, and tends to accelerate the speed of the engine. This occurring coincidently with the application of the increased load, the tendency to retardation of velocity is overcome, and hence the speed of the engine is maintained undiminished.

It is obvious the sensitiveness of the auxiliary governor may be increased or diminished by shifting the weight along the lever G, since this will increase or diminish the pressure of the friction-roller on the belt D, and thus cause an increased tension of the latter to vibrate the lever—i. e., affect its position more or less quickly.

I do not restrict myself to the precise arrangement shown, since the lever may be otherwise arranged. For example, it may be placed so as to act on the upper side of the lower half of the belt instead of the under side thereof.

What I claim is—

1. In an auxiliary governor for steam-engines, a pivoted weighted lever and a valve suitably connected thereto, in combination with the driving-belt, substantially as shown and described, whereby the increased tension on the belt, due to an increased or additional load being thrown on the engine, operates said lever and raises the valve, thus instantly allowing freer admission of steam to the piston-cylinder, as specified.

2. In an auxiliary governor, the combination of the weighted pivoted lever G, the valve H, and the connecting devices—namely, rods, levers, pinion, shaft, and rack-bar—with the belt D, the fly-wheel, and the power-shaft pulley, all substantially as shown and described, to operate as specified.

JOHN MILTON.

Witnesses:
W. E. GARRETT,
E. LITTLETON.